United States Patent
Vogelsgesang et al.

(10) Patent No.: US 11,055,284 B1
(45) Date of Patent: Jul. 6, 2021

(54) OPTIMIZING DOMAIN QUERIES FOR RELATIONAL DATABASES

(71) Applicant: Tableau Software, Inc., Seattle, WA (US)

(72) Inventors: Adrian Vogelsgesang, Munich (DE); Manuel Then, Munich (DE); Jan Finis, Munich (DE); Tobias Muehlbauer, Munich (DE); Richard Wesley, Seattle, WA (US); Pawel Terlecki, Seattle, WA (US)

(73) Assignee: TABLEAU SOFTWARE, INC., Seattle, WA (US)

( * ) Notice: Subject to any disclaimer, the term of this patent is extended or adjusted under 35 U.S.C. 154(b) by 679 days.

(21) Appl. No.: 15/942,343

(22) Filed: Mar. 30, 2018

Related U.S. Application Data

(63) Continuation-in-part of application No. 15/885,677, filed on Jan. 31, 2018, now Pat. No. 10,901,990.

(60) Provisional application No. 62/528,903, filed on Jul. 5, 2017, provisional application No. 62/527,767, filed on Jun. 30, 2017.

(51) Int. Cl.
*G06F 16/2453* (2019.01)

(52) U.S. Cl.
CPC .... *G06F 16/2454* (2019.01); *G06F 16/24542* (2019.01)

(58) Field of Classification Search
None
See application file for complete search history.

(56) References Cited

U.S. PATENT DOCUMENTS

| | | | |
|---|---|---|---|
| 5,379,422 A | 1/1995 | Antoshenov | |
| 5,819,255 A * | 10/1998 | Celis | ................. G06F 16/24542 |
| 6,275,818 B1 | 8/2001 | Subramanian et al. | |
| 7,574,424 B2 | 8/2009 | Chowdhuri | |
| 8,239,847 B2 | 8/2012 | Yu et al. | |
| 8,898,145 B2 | 11/2014 | Wang et al. | |

(Continued)

OTHER PUBLICATIONS

Lehner, et al., Web-Scale Data Management for the Cloud, "Chapter 4: Web-Scale Analytics for BIG Data," Springer Science+Business Media, New York, NY, © 2013, pp. 91-135.

(Continued)

*Primary Examiner* — Aleksandr Kerzhner
*Assistant Examiner* — Eddy Cheung
(74) *Attorney, Agent, or Firm* — Morgan, Lewis & Bockius LLP

(57) ABSTRACT

A database engine receives a database query that specifies retrieving data from a data source. The database engine parses the query to build an operator tree that includes a TableScan operator configured to scan a table from the data source to produce outputs corresponding to a single data field from the table, and includes a GroupBy operator that groups rows of the table according to the data field. The database engine generates and executes code corresponding to the operator tree to retrieve a result set. When the TableScan operator is a child of the GroupBy operator and the outputs are independent of duplicate input rows from the table, execution of the TableScan operator comprises, for each storage block of rows from the table: determining a storage compression scheme for encoding the data field and, for certain encodings, using the encoding to produce the outputs without duplication of rows.

20 Claims, 12 Drawing Sheets

(56) References Cited

U.S. PATENT DOCUMENTS

| | | | |
|---|---|---|---|
| 9,773,041 | B2 | 9/2017 | Cruanes et al. |
| 9,922,066 | B2 * | 3/2018 | Swan .................... G06F 16/951 |
| 2003/0120682 | A1 | 6/2003 | Bestgen et al. |
| 2009/0228414 | A1 | 9/2009 | Dumeur et al. |
| 2010/0191720 | A1 | 7/2010 | Al-Omari et al. |
| 2011/0137890 | A1 | 6/2011 | Bestgen et al. |
| 2011/0313999 | A1 | 12/2011 | Bruno et al. |
| 2012/0136850 | A1 | 5/2012 | Barsness et al. |
| 2012/0323885 | A1 * | 12/2012 | Wang ................ G06F 16/24534 707/714 |
| 2013/0091122 | A1 | 4/2013 | Salch et al. |
| 2014/0095472 | A1 | 4/2014 | Lee et al. |
| 2014/0258266 | A1 | 9/2014 | Cruanes et al. |
| 2014/0317085 | A1 * | 10/2014 | Wehrmeister ..... G06F 16/24544 707/714 |
| 2016/0140128 | A1 * | 5/2016 | Swan .................... G06F 16/951 707/725 |
| 2016/0350371 | A1 | 12/2016 | Das et al. |
| 2017/0031975 | A1 | 2/2017 | Mishra et al. |
| 2017/0255674 | A1 | 9/2017 | Attaluri et al. |
| 2017/0357708 | A1 * | 12/2017 | Ramachandran ..... G06F 16/283 |
| 2018/0024922 | A1 | 1/2018 | Hassan |
| 2018/0039575 | A1 | 2/2018 | De Smet et al. |
| 2018/0089268 | A1 | 3/2018 | Lee et al. |
| 2018/0121426 | A1 | 5/2018 | Barsness et al. |
| 2018/0157707 | A1 | 6/2018 | Lurie et al. |
| 2018/0314733 | A1 | 11/2018 | Wen et al. |

OTHER PUBLICATIONS

Schreier, Preinterview First Office Action, U.S. Appl. No. 15/650,658, dated Apr. 29, 2019, 4 pgs.
Schreier, First Action interview Office Action, U.S. Appl. No. 15/650,658, dated Jun. 27, 2019, 4 pgs.
Schreier, Notice of Allowance, U.S. Appl. No. 15/650,658, dated Oct. 10, 2019, 10 pgs.
Schreier, Preinterview First Office Action, U.S. Appl. No. 15/681,294, dated Mar. 6, 2020, 4 pgs.
Schreier, First Action, Preinterview Office Action, U.S. Appl. No. 15/681,294, dated Mar. 31, 2020, 4 pgs.
Vogelsgesang, Notice of Allowance, U.S. Appl. No. 16/231,302, dated Jun. 22, 2020, 9 pgs.
Vogelsgesang, Notice of Allowance, U.S. Appl. No. 15/885,677, dated Oct. 30, 2020, 11 pgs.

* cited by examiner

```
SELECT columnX FROM underlyingTable WHERE columnX > 10 GROUP BY columnX
```

Figure 4A

```
SELECT segment
FROM sales
WHERE order_date >= '01/01/2015'::datetime
GROUP BY segment
ORDER BY segment
```

Figure 4B

```
SELECT MIN(order_date) AS min_date, MAX(order_date) AS max_date
FROM transactions
```

SELECT columnX FROM underlyingTable GROUP BY columnX

Figure 4E

SELECT MIN(columnX), MAX(columnX) FROM underlyingTable

Figure 4F

SELECT columnX FROM underlyingTable GROUP BY columnX ORDER BY columnX

Figure 4G

SELECT MIN(columnX) FROM underlyingTable

Figure 4H

SELECT COUNT(DISTINCT columnX) FROM underlyingTable

Figure 4I

SELECT DISTINCT columnX FROM underlyingTable ORDER BY columnX

Figure 4J

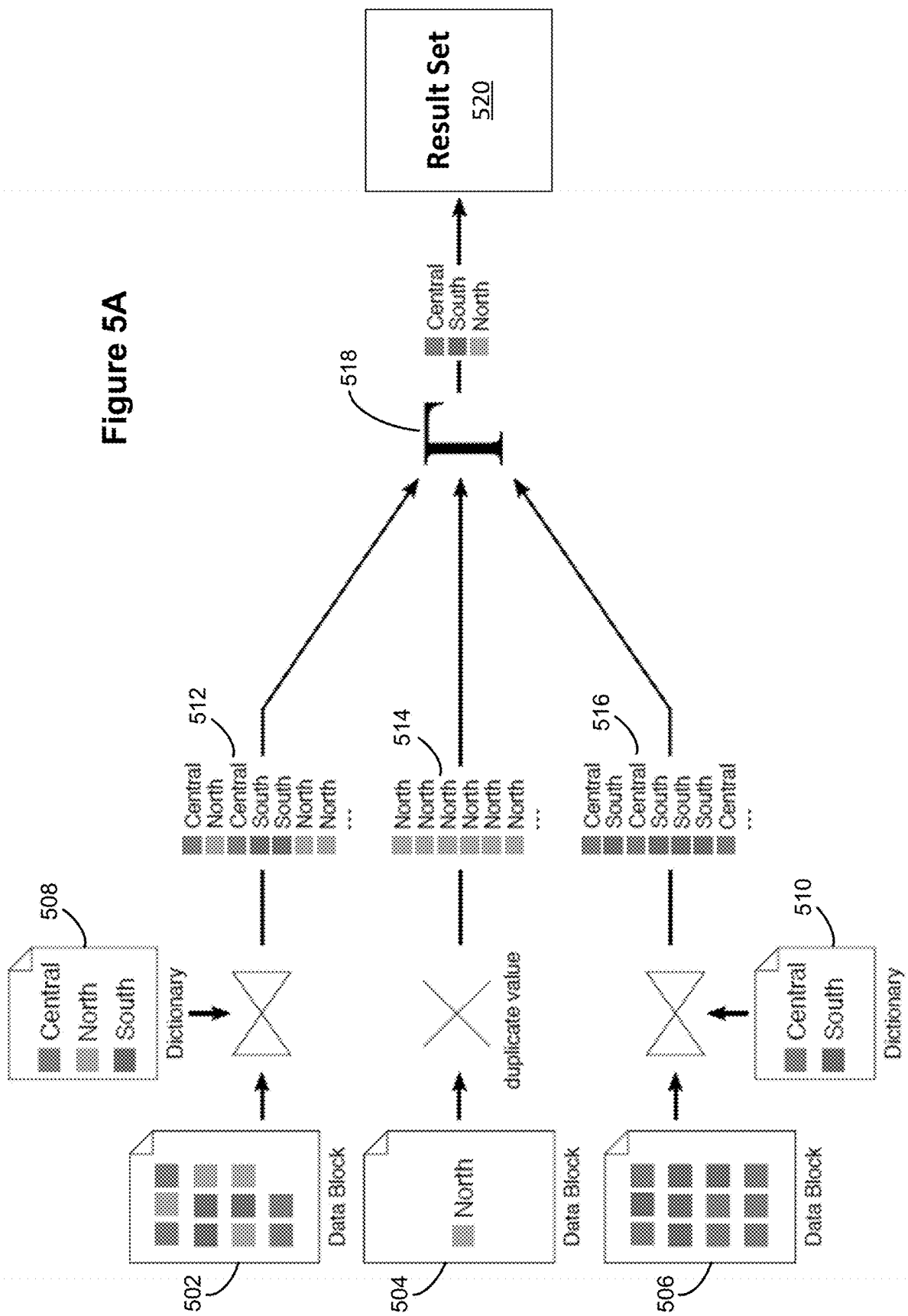

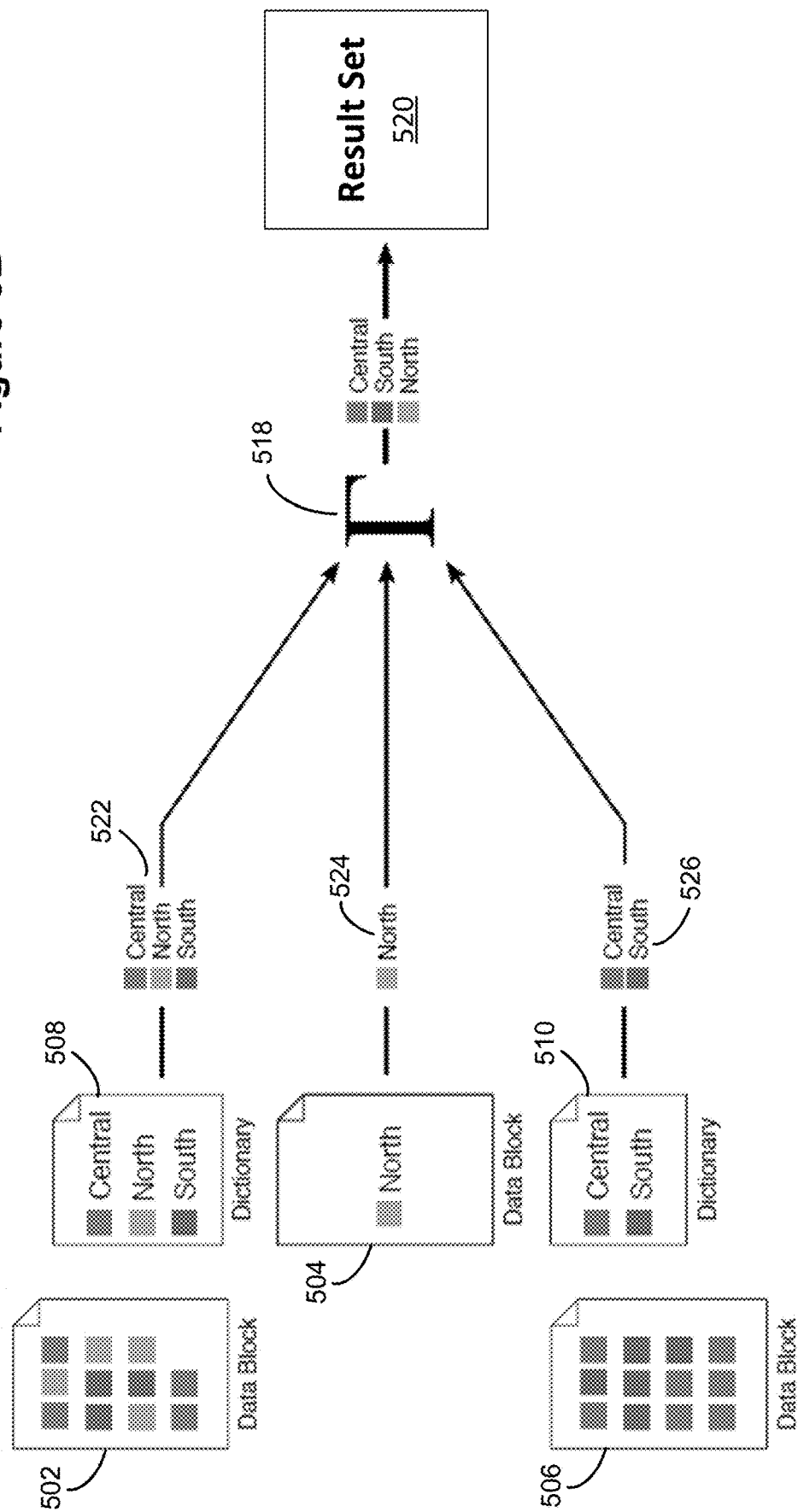

(A)

618 In accordance with a determination that the TableScan operator is a child of the GroupBy operator in the operator tree and a determination that the one or more outputs either do not include any aggregate functions or include only aggregate functions whose calculated values are independent of duplicate input rows from the table, implementation of the TableScan operator within the generated code comprises: determining a respective storage compression scheme for encoding the data field within the respective block and when the respective storage compression scheme is dictionary encoding, frame of reference encoding using a single byte, or single-value encoding, using the encoding to produce the one or more outputs without duplication of rows.

620 A first storage block for the table encodes the data field using dictionary encoding according to a first dictionary. Producing the one or more outputs for the first storage block comprises scanning the first dictionary instead of scanning the table.

622 A first storage block for the table encodes the data field using single-value encoding, which specifies a single data value for the data field for all rows of the table within the first storage block. Producing the one or more outputs for the first storage block comprises producing a single instance of the single data value.

624 A first storage block for the table encodes the data field using frame of reference encoding using a single byte. Producing the one or more outputs for the first storage block comprises: allocating a bit array of 256 bits, each bit corresponding to a distinct data value for the data field in the first storage block and scanning the rows of the table in the first storage block.

626 The scanning includes: reading a respective offset value for the data field in the respective row; when a respective bit corresponding to the respective offset value is already set in the bit array, forgoing production of the corresponding data value; and when the respective bit is not already set in the bit array, looking up the corresponding data value according to the offset value, producing the corresponding data value, and setting the respective bit in the bit array.

628 A first storage block for the table encodes the data field using an encoding other than dictionary encoding, frame of reference encoding using a single byte, or single-value encoding. Producing the one or more outputs, for the first storage block comprises producing a data value instance for each row of the table in the first storage block, regardless of duplication.

630 At least two of the storage blocks from the table use different storage compression schemes for encoding the data field.

632 The aggregate functions whose calculated values are independent of duplicate input rows from the table include the aggregate functions MIN() and MAX().

OPTIMIZING DOMAIN QUERIES FOR RELATIONAL DATABASES

RELATED APPLICATIONS

This application is a continuation-in-part of U.S. application Ser. No. 15/885,677, filed Jan. 31, 2018, entitled "Elimination of Common Subexpressions in Complex Database Queries," which claims priority to U.S. Provisional Application Ser. No. 62/527,767, filed on Jun. 30, 2017, entitled "Elimination of Common Subexpressions in Complex Database Queries," and U.S. Provisional Application Ser. No. 62/528,903, filed on Jul. 5, 2017, entitled "Elimination of Common Subexpressions in Complex Database Queries," each of which is incorporated by reference herein in its entirety.

TECHNICAL FIELD

The disclosed implementations relate generally to relational database systems, and more specifically to system features that improve query execution performance.

BACKGROUND

A database engine receives queries, and retrieves data from one or more database tables to provide the data requested by the query. A database query is expressed in a specific query language, such as SQL. In general, a database query specifies the desired data without specifying a detailed execution plan about how to retrieve the data. For example, in SQL, the query includes a SELECT clause, a FROM clause, and a WHERE clause, which specify the data columns desired, the tables that include the desired columns, and conditions on how the data is selected. SQL queries may also contain a GROUP BY clause, a HAVING clause, and/or an ORDER BY clause. It is up to the database engine to parse each query, build an execution plan, and execute the plan to retrieve the requested results. This gives the database engine substantial flexibility. However, different execution plans for the same query can have enormously different execution times to retrieve the results. For example, one execution plan may retrieve the results in less than a second, whereas a second plan may take hours to retrieve exactly the same results. To address this issue, database engines typically include one or more optimization layers to improve execution performance. Unfortunately, existing database engines have difficulty optimizing certain types of queries.

SUMMARY

When an SQL query is received by a database engine, the query is parsed and translated into an abstract syntax tree. Semantic analysis turns the syntax tree into an operator tree. Building the operator tree combines the syntax tree with schema information, resolves table and column names, and resolves internal references within the query. During logical optimization the database engine applies constant folding, predicate pushdown, and join reordering, as well as other optimization techniques. Next, the database engine chooses a physical implementation for each of the algebraic operators in the operator tree. During this phase, the database engine also chooses the appropriate access path and indices to retrieve the requested data as fast as possible. In some implementations, the optimized operator tree is compiled to LLVM intermediate representation (IR) code. The IR code is passed to an LLVM compiler, which compiles the intermediate representation to native machine code. This compiled code is then loaded and linked with the database engine at runtime and executed. The database engine is essentially an optimizing JIT compiler for SQL queries.

In some implementations, the database engine uses Low Level Virtual Machine (LLVM) as an intermediate representation before generating native machine code. LLVM provides an extensible and reusable compiler framework. It is centered around a platform-agnostic intermediate representation (IR). LLVM IR represents a program in a low-level assembly-like language on an infinite-register machine. Because it is built to allow efficiently applying code optimizations, the IR is represented in static single assignment (SSA) form. Similar to some functional languages, programs in SSA form can assign each register only once. Thanks to this restriction, optimization passes can be implemented more efficiently and do not need to track the lifetimes of register assignments. Instructions are contained in basic blocks. Basic blocks represent a continuous block of instructions that is interrupted neither by outgoing nor by incoming jumps. One or more basic blocks form a function.

LLVM provides an API, which enables building code in this IR format. The API offers a variety of optimization passes operating on the IR format. In addition, the optimized code can be compiled to native machine code. The database engine leverages the infrastructure provided by LLVM in order to directly load the generated code into its own process. As soon as the code is compiled and loaded using LLVM, the database engine can call the compiled functions just like other C++ functions.

In some implementations, the data is stored in blocks, and may be stored in a columnar format. In addition to the actual data, each block contains a small materialized aggregate (SMA). This aggregate contains the minimum and maximum values for each data field contained in the current block. Using the SMAs, the database engine is able to evaluate restrictions on whole blocks at once during table scans. One can infer from the minimum and maximum values when the condition cannot be satisfied, so the whole block is skipped. On the other hand, the comparison can also show that the restriction is a tautology for the tuples contained in the current data block. In this case, the evaluation of the restriction on each individual block can be omitted. Furthermore, each column contains a so-called Positional SMA (PSMA). PSMAs enable further narrowing down the range within a block that contains tuples that potentially satisfy the restriction.

Disclosed implementations identify domain queries within database queries, and optimize the processing of the domain queries. In some instances, a database query consists solely of one domain query, but in other instances a database query contains one or more domain subqueries. A domain query identifies the range or set of possible values for an individual data field (e.g., the set of distribution Regions for a company or the range of temperatures measured at a site).

The method receives a database query, which specifies retrieval of data from a data source. The method parses the database query to build an operator tree, which includes a plurality of operators. The operator tree includes a TableScan operator configured to scan a table from the data source to produce one or more outputs corresponding to a single data field from the table. The operator tree also includes a GroupBy operator, which groups rows of the table according to the single data field. The method generates code corresponding to the operator tree and executes the generated code to retrieve a result set correspond to the database query. When the TableScan operator is a child of the GroupBy operator in the operator tree and the one or more outputs either do not include any aggregate functions or include only aggregate functions whose calculated values are independent of duplicate input rows from the table, implementation of the TableScan operator within the generated code comprises, for each storage block of rows from the table, determining a respective storage compression scheme for encoding the data field within the respective block and, when the respective storage compression scheme is dictionary encoding, frame of reference encoding using a single byte (sometimes also for encoding using two bytes), or single-value encoding, using the encoding to produce the one or more outputs without duplication of rows. The method further includes returning the result set.

In some instances, a first storage block for the table encodes the data field using dictionary encoding according to a first dictionary, and producing the one or more outputs, for the first storage block, comprises scanning the first dictionary instead of scanning the table.

In some instances, a first storage block for the table encodes the data field using single-value encoding, which specifies a single data value for the data field for all rows of the table within the first storage block, and producing the one or more outputs, for the first storage block, comprises producing a single instance of the single data value.

In some instances, a first storage block for the table encodes the data field using frame of reference encoding using a single byte, and producing the one or more outputs, for the first storage block, comprises allocating a bit array of 256 bits, each bit corresponding to a distinct data value for the data field in the first storage block and scanning the rows of the table in the first storage block. The scanning includes, for each row in the table, reading a respective data value for the data field in the respective row. When a respective bit corresponding to the respective data value is already set in the bit array, the method forgoes production of the respective data value, and when the respective bit corresponding to the respective data value is not already set in the bit array, the method produces the respective data value and sets the respective bit in the bit array.

In some instances, a first storage block for the table encodes the data field using an encoding other than dictionary encoding, frame of reference encoding using a single byte, or single-value encoding, and producing the one or more outputs, for the first storage block, comprises producing a data value instance for each row of the table in the first storage block, regardless of duplication.

In some instances, the database query is created in response to user input to select a filter control in a graphical user interface, and the result set populates the filter control with a set of possible filter values.

In some implementations, the method further comprises setting a flag on the TableScan operator in the operator tree. The flag indicates that duplicate data values for the data field will be eliminated by the GroupBy operator.

In some instances, the TableScan operator reads only rows from the table that satisfy a row-level filter condition.

In some instances, at least two of the storage blocks from the table use different storage compression schemes for encoding the data field.

In some implementations, implementation of the GroupBy operator within the generated code combines intermediate results produced by the TableScan operator for each of the storage blocks, and removes any residual duplication of data values for the data field.

In some implementations, the aggregate functions whose calculated values are independent of duplicate input rows from the table include the aggregate functions MIN( ) and MAX( ).

In accordance with some implementations, a database engine executes at one or more computing devices, each having one or more processors and memory. The memory stores one or more programs configured for execution by the one or more processors, and the one or more programs comprise instructions for performing any of the methods described herein.

In accordance with some implementations, a computer system includes one or more processors/cores, memory, and one or more programs. The one or more programs are stored in the memory and configured to be executed by the one or more processors/cores. The one or more programs include instructions for performing any of the methods described herein.

In accordance with some implementations, a computer-readable storage medium stores instructions for the one or more programs. When executed by one or more processors/cores of a computer system, these instructions cause the computer system to perform any of the methods described herein.

Thus methods, systems, and computer readable media are disclosed that provide more efficient processing of domain queries.

Both the foregoing general description and the following detailed description are exemplary and explanatory and are intended to provide further explanation of the invention as claimed.

BRIEF DESCRIPTION OF THE DRAWINGS

For a better understanding of the aforementioned systems and methods that provide efficient database query processing, reference should be made to the Description of Implementations below, in conjunction with the following drawings in which like reference numerals refer to corresponding parts throughout the figures.

FIGS. 4A, 4B, and 4C illustrate exemplary domain queries, in accordance with some implementations.

FIG. 4D illustrates exemplary filters that may generate domain queries, in accordance with some implementations.

FIGS. 4E-4J provide additional examples of domain queries, in accordance with some implementations.

FIG. 5A illustrates execution of an unoptimized domain query, in accordance with some implementations.

FIG. 5B illustrates execution of an optimized domain query in accordance with some implementations.

FIGS. 6A-6C provide a flowchart of a process for retrieving data from a database, in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
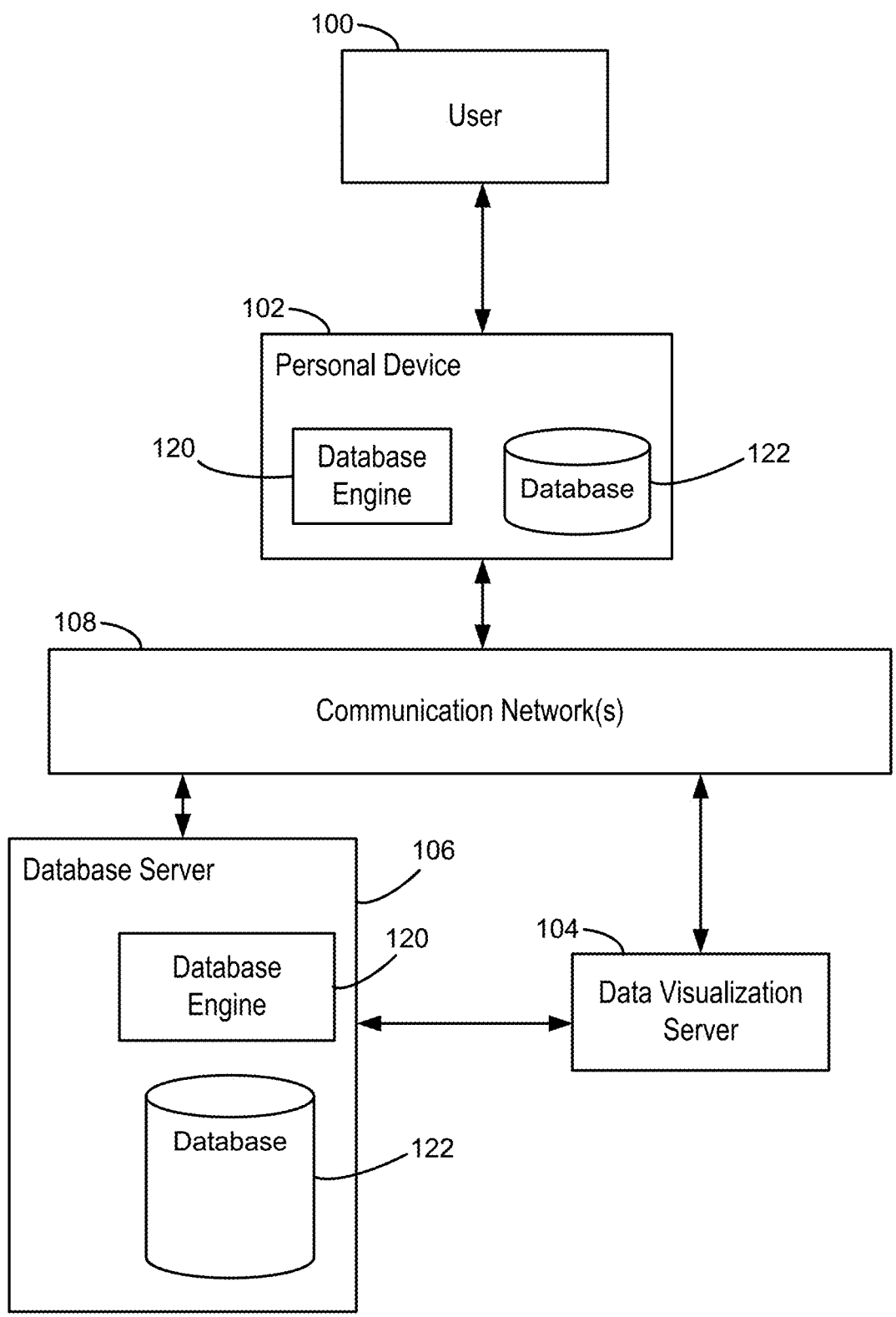
FIG. 1 illustrates the context for a database system in accordance with some implementations.

FIG. 1 illustrates a context in which some implementations operate. A user 100 interacts with a personal device 102, such as a desktop computer, a laptop computer, a tablet computer, or a mobile computing device. A personal device 102 is an example of a computing device 200. The term "computing device" also includes server computers, which may be significantly more powerful than a personal device used by a single user, and are generally accessed by a user only indirectly. An example computing device 200 is described below with respect to FIG. 2, including various software programs or modules that execute on the device 200. In some implementations, the personal device 102 includes one or more desktop data sources 224 (e.g., CSV files or spreadsheet files). In some implementations, the personal device 102 includes a database engine 120, which provides access to one or more relational databases 122 (e.g., SQL databases). In some implementations, the personal device includes a data visualization application 222, which the user 100 uses to create data visualizations from the desktop data sources 224 and/or the relational databases 122. In this way, some implementations enable a user to visualize data that is stored locally on the personal device 102.

In some cases, the personal device 102 connects over one or more communications networks 108 to one or more external database servers 106 and/or a data visualization server 104. The communication networks 108 may include local area networks and/or wide area networks, such as the Internet. In some implementations, the data visualization server 104 provides a data visualization web application that runs within a web browser 220 on the personal device 102. In some implementations, data visualization functionality is provided by both a local application 222 and certain functions provided by the data visualization server 104. For example, the data visualization server 104 may be used for resource intensive operations. In some implementations, the one or more database servers 106 include a database engine 120, which provides access to one or more databases 122 that are stored at the database server 106. As illustrated in FIG. 1, a database engine 120 and corresponding databases 122 may reside on either a local personal device 102 or on a database server 106. In some implementations (not illustrated here), the data visualization server 104 includes a database engine 120 and one or more databases 122.

Figure 2:
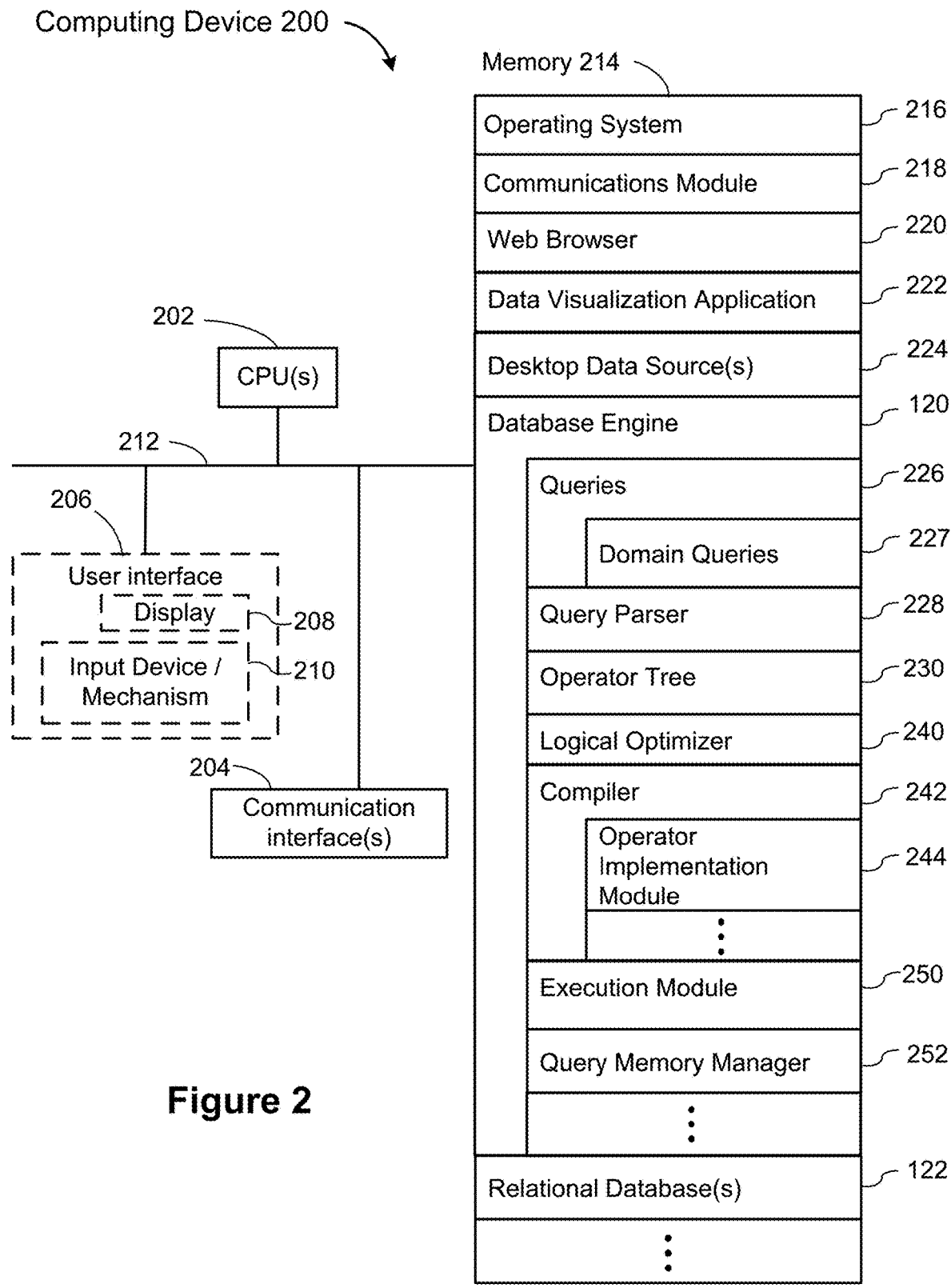
FIG. 2 is a block diagram of a computing device according to some implementations.

FIG. 2 is a block diagram illustrating a computing device 200 in accordance with some implementations. As used herein, the term "computing device" includes both personal devices 102 and servers, such as a database server 106 or a data visualization server 104. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 may include a user interface 206 comprising a display device 208 and one or more input devices or mechanisms 210. In some implementations, the input device/mechanism 210 includes a keyboard; in some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display). In some implementations, the memory 214 includes high-speed random-access memory, such as DRAM, SRAM, DDR RAM, or other random access solid state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPU(s) 202. The memory 214, or alternatively the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks 108, such as the Internet, other wide area networks, local area networks, metropolitan area networks, and so on;
- a web browser 220 (or other client application), which enables a user 100 to communicate over a network with remote computers or devices. In some implementations, the web browser 220 executes a data visualization web application (not shown) downloaded from a data visualization server 104. In some implementations, a data visualization web application (not shown) is an alternative to storing a data visualization application 222 locally;
- a data visualization application 222, which enables users to construct data visualizations from various data sources. The data visualization application 222 retrieves data from one or more data sources, such as a desktop data source 224 (e.g., a CSV file or flat file), a relational database 122 stored locally, or a desktop data source or relational database 122 stored on another device (such as a database server 106). The data visualization application then generates and displays the retrieved information in one or more data visualizations;
- one or more desktop data sources 224, which have data that may be used and displayed by the data visualization application 222. Data sources 224 can be formatted in many different ways, such as spreadsheets, XML files, flat files, CSV files, text files, JSON files, or desktop database files. Typically, the desktop data sources 224 are used by other applications as well (e.g., a spreadsheet application);
- a database engine 120, which receives database queries 226 (e.g., a query from a data visualization application) and returns corresponding data. The database queries may include domain queries 227. The database engine 120 typically includes a plurality of executable modules;

the database engine 120 invokes a query parser 228, which parses each received query 226 (e.g., SQL database query) to form an operator tree 230. An operator tree is sometimes referred to as an expression tree or an algebra tree. In some implementations, the query parser 228 is contained within the compiler 242;

the database engine 120 includes a logical optimizer 240, which can modify an operator tree 230 for faster execution;

the database engine 120 includes a compiler 242, which translates each operator tree 230 into executable code. In some implementations, the compiler 242 includes an operator implementation module 244, which generates code for the operators in the operator tree 230. The operator implementation module 244 is an optimizer, which selects an implementation for each operator. For a TableScan operator, the implementation depends on whether or not it is part of a domain query;

the database engine 120 includes an execution module 250, which executes the code generated by the compiler 242; and the database engine 120 also includes a query memory manager 252, which tracks memory utilization by each of the processes, and dynamically allocates memory as needed. In some implementations, the memory manager 252 detects when there is insufficient memory while executing the compiled code. In some implementations, the query memory manager 252 communicates with the execution module 250.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 214 stores a subset of the modules and data structures identified above. Furthermore, in some implementations, the memory 214 stores additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Standard relational database query engines rely on relational algebra trees (e.g., an operator tree 230) for evaluating logically optimized plans. A typical algebra tree 230 has the nice property that its leaves correspond to base relations and each node in the tree 230 can be evaluated based solely on nodes of its subtree. To evaluate a node in the tree, a typical "iterator engines" works by pulling intermediate results from the subtrees corresponding to children of the node.

Domain queries 227 are queries that are issued to obtain the domain of a data field (e.g., the set of different values that occur in a column). In some implementations, the obtained domain is used to populate a filter list or a drop-down menu. For instances where the physical storage layer contains duplicate-free structures (e.g., the data is encoded in a way that eliminates duplicates) the storage layer can be leveraged to speed up domain queries. For example, the physical storage layer (e.g., blocks) may use dictionary encoding, single-value encoding, or frame of reference encoding using a single byte. Alternative types of queries may be eligible for optimization in addition to domain queries.

Figure 3A:
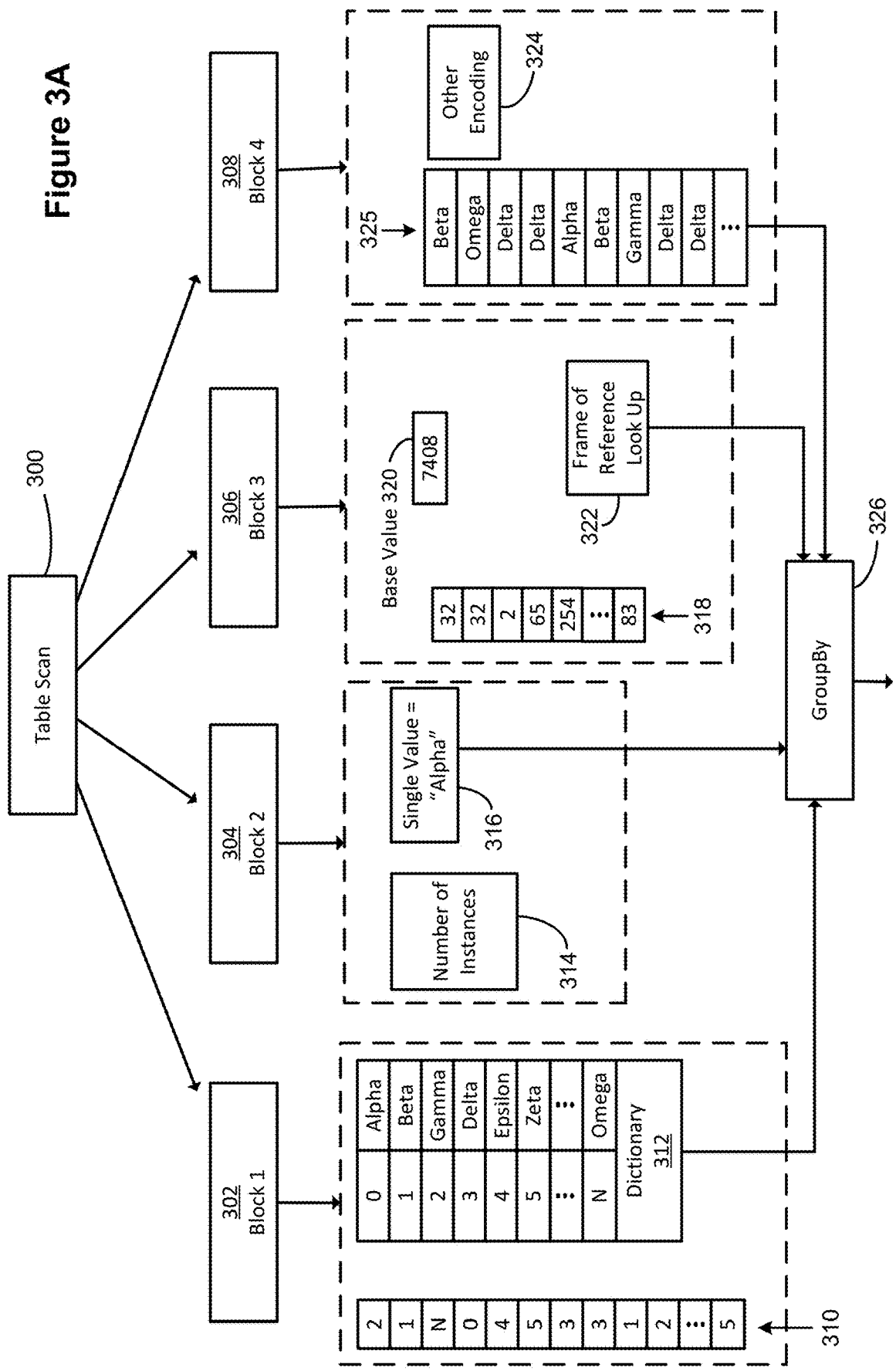
FIGS. 3A and 3B illustrate processing a domain query on blocks having different compression schemes, in accordance with some implementations.

FIG. 3A provides an example of domain query optimization at the physical level. In this example, a TableScan operator 300 scans a specific column (data field) of a table. The data for this table is stored in blocks, such as Block 1 (302), Block 2 (304), Block 3 (306), and Block 4 (308). Additional blocks (not shown) may also store data for the table. Each block encodes the data from the column using a compression scheme. Each block may have a different type of encoding and/or compression scheme. Some blocks may use the same type of encoding and/or compression scheme (e.g., a plurality of blocks may be encoded using dictionary encoding).

In general, a TableScan operator produces one column value for each row based on reversing the compression scheme. This typically results in duplicate values (and potentially many duplicate values). If the TableScan is followed by GroupBy operator, the GroupBy operator removes the duplicate values. However, a process that creates mass duplication just to subsequently remove the duplicates is inefficient. The disclosed techniques use the compression schemes to reduce or eliminate the creation of duplicates during the TableScan when the TableScan is part of a domain query.

Figure 3B:
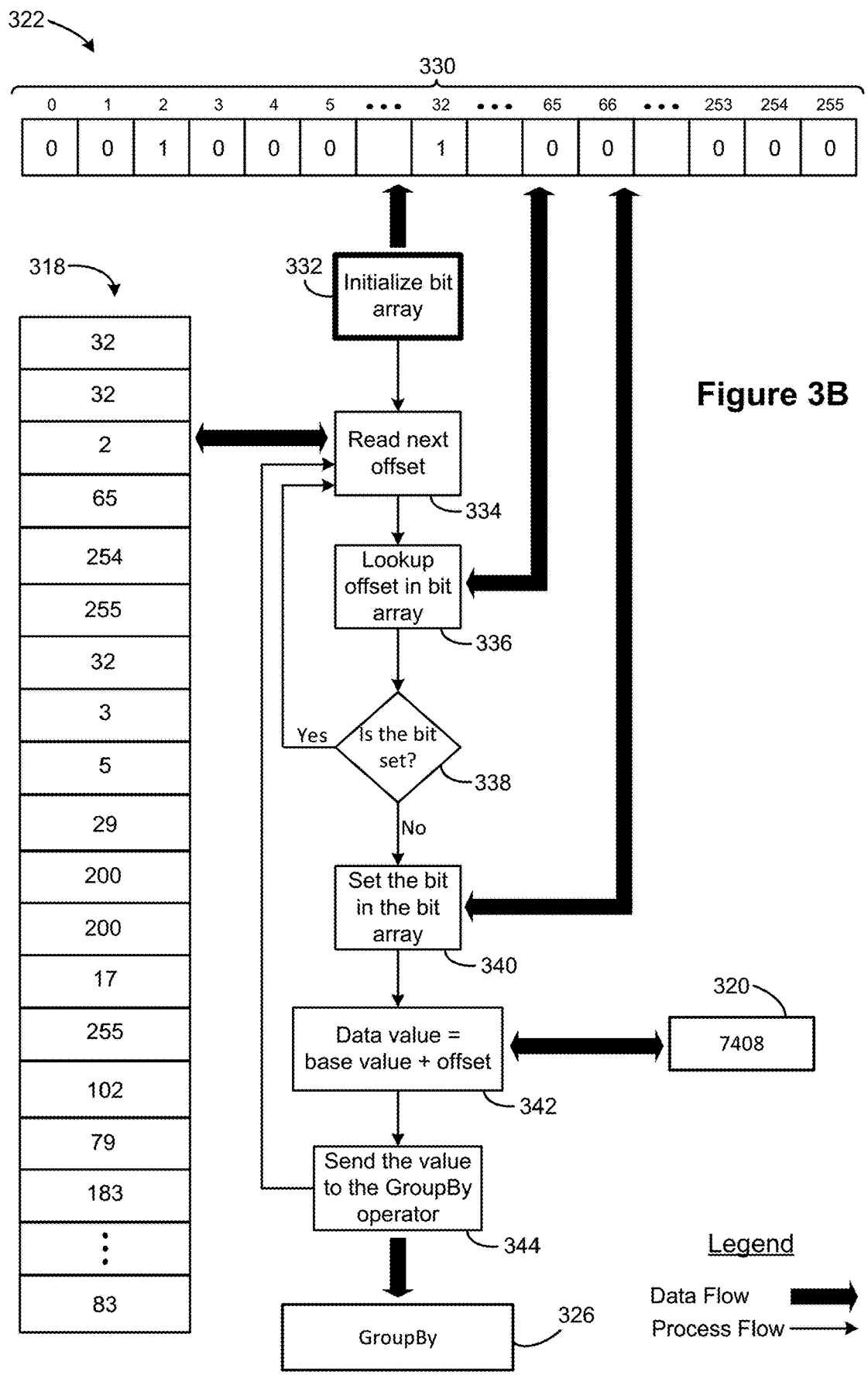

In this example of FIGS. 3A and 3B, the TableScan operator 300 is a child of a GroupBy operator 326 in the operator tree. Assume the one or more outputs from the TableScan involve only a single data field. Also, assume that the outputs either do not include any aggregate functions (e.g., the output is just the data field itself) or include only aggregate functions whose calculated values are independent of duplicate input rows from the table (e.g., the aggregate functions MIN( ) and/or MAX( )). Based on these conditions, the TableScan/GroupBy combination is identified as a domain query, so the implementation of the TableScan operator 300 is tuned to remove as many duplicates as possible.

For each storage block, the TableScan operator 300 (i.e., the generated code for the TableScan operator) determines the respective storage compression scheme for encoding the data field (also referred to as the "column" or "field") within the respective block. When the respective storage compression scheme is dictionary encoding, frame of reference encoding using a single byte, or single-value encoding, the database engine uses the encoding to produce the one or more outputs without duplication of rows instead of forwarding the entire data block to the GroupBy operator. FIG. 3A illustrates blocks having each of these three types of compression, as well as one block that does not use one of these three types of compression.

Each block is processed independently. Within each block, as many duplicates as possible are suppressed when it is efficient to do so. In some blocks (e.g., Block 4 (308)), it is not efficient to remove duplicates during the TableScan, so all of the values are sent to the GroupBy operator for duplication removal. In addition, because each Block is a self-contained unit, there may be duplicates produced across block boundaries (e.g., some values are in both Block 1 (302) and Block 2 (304)). Any residual duplication is ultimately removed by the GroupBy operator.

For illustration here, the data values for the data field are listed as "Alpha," "Beta," "Gamma," "Delta," and so on. Assume that it is not known in advance to a user how many distinct data values there are (and the number of distinct values is not limited by the labels used here). Because frame of reference encoding applies only to numeric data fields, it would not be an available encoding for a string data field as depicted in the first, second, and fourth blocks 302, 304, and 308. For the purposes of the third block 306 only, assume that the data field is numeric.

In, Block 1 (302) the data field is encoded using a dictionary compression scheme. The dictionary 312 shows that a code value of '2' corresponds to the data value 'Gamma.' There is only a single entry in the dictionary corresponding to each data value. In this way, data values for the data field are stored as a list 310 of encoded values. Because each block contains many rows of data (e.g., 64K rows or 128K rows), storing codes instead of long data values can substantially reduce storage size. Because each distinct data value is in the dictionary 312, the TableScan operator 300 sends the data values from the dictionary 312 to the GroupBy operator 326 without scanning the large list 310 of encoded data values. This eliminates sending duplicate values from the TableScan of Block 1 to the GroupBy operator 326 (the dictionary 312 does not store duplicate values).

Block 2 (304) is encoded using a single-value encoding scheme. That is, Block 2 stores the number of rows (instances) 314 in the block and the single value 316. In this example, the single value stored is "Alpha." The TableScan operator 300 is able to utilize the single value encoding scheme to simply pass the single value "Alpha" 316 to the GroupBy operator. Accordingly, no duplicates are passed from Block 2 to the GroupBy operator 326. This reduces the work substantially, particularly when the block stores many rows (e.g., 64K or 128K rows).

Block 3 (306) is encoded with a frame of reference encoding using a single byte. In frame-of-reference encoding, each data value is encoded as an offset from a reference value 320. The spread of the data values determines the space required for each encoding. For example, if all of the data values fall within a range of 256 units, the offset may be specified using a single byte. In some instances, the range can be even greater when all of the differences are multiples of some minimum delta value. For example, if all of the differences are multiples of 10, some implementations specify a logical offset, which is multiplied by the minimum delta value to compute the actual offset. Common frame-of-reference encodings use one, two, or four bytes.

Block 3 (306) uses a single byte for each encoding, so the list 318 of offsets uses one byte per row of data. The data value corresponding to each row is the base value (=7408) plus the offset value. For example, the data value for the first row is 7408+32=7440. As illustrated in the offset list 318, there are multiple rows that specify the same offset. For example, the first and second rows specify an offset of 32, so they have the same data value for the data field. A process 322 for identifying the distinct data values for the third block is illustrated in FIG. 3B. The process is able to efficiently remove duplication and send only a set of distinct data values to the GroupBy operator 326. When a block can have on the order of 64K rows and there are at most 256 distinct data values for the data field, the process substantially reduces the processing time.

Block 4 (308) is encoded using another encoding scheme 324 (e.g., an encoding scheme other than a dictionary encoding, a single-value encoding, or a frame of reference encoding using a single byte). In this example, because the encoding is not one of the identified encoding schemes, the TableScan operator 300 scans all of the stored data values 325 and passes every scanned value to the GroupBy operator 326.

In this example, the TableScan operator 300 has specific implementations that efficiently handle blocks that are stored at the physical level using dictionary encoding, single-value encoding, or frame-of-reference encoding using a single byte. One of skill in the art recognizes that data may be encoded in other ways as well, and some of the additional encoding techniques can be optimized for domain query optimization. For example, some implementations eliminate duplication for blocks using a frame-of-reference encoding using two bytes. This can be particularly useful for database engines that utilize large block sizes, or when it is known that the total number of distinct data values for the block is much smaller than the capacity provided by two bytes.

As described above with reference to Block 3 (306) in FIG. 3A, FIG. 3B provides a detailed description of the frame of reference lookup scheme 322 to determine which values the TableScan operator 300 passes to the GroupBy operator 326.

As illustrated in FIG. 3B, the offset list 318 encodes the data values. The actual data values are equal to the reference value 320 (=7408) plus the offset value. The frame of reference lookup scheme 322 includes implementing a bit array 330 (also referred to as a bit set), which stores 256 bits, one bit for each of the possible 256 data values stored in the storage 320. The bit array 330 is initialized (332) with zeros before the TableScan begins.

The TableScan operator reads (334) the first offset value, which is 32 and then looks up (336) the offset in the bit array 330. When the bit in the bit array 330 is (338) already set, the process moves on to read (334) the next offset value from the offset list 318. Because the bit array is initialized to all zeros, the very first lookup in the bit array will find a bit that is definitely not set.

When the bit is (338) not set, the process takes three actions: set (340) the bit in the bit array 330 (so that it will not be used again); compute (342) the data value as the sum of the base value 320 plus the offset value; and send (344) the data value to the GroupBy operator 326. The process then reads (334) the next offset in the offset list 318.

In some implementations, the hardware provides an atomic operation that both reads a bit and sets it to 1 at the same time, in which case the process steps 336 and 340 can be combined. In some implementations, the data values sent to the GroupBy operator are collected and "sent" as a batch (e.g., buffered), but in other implementations, the process forwards the data values to the GroupBy operator individually as they are identified.

The TableScan continues to process the offset list 318 until all of the rows are processed. For example, the second offset value is 32 again. The bit array 330 is checked (336) at position 32, which is set to "1" because of the offset value for the first row. Thus, the TableScan operator skips over the second offset value and immediately reads (334) the next offset value. In this way, the frame of reference encoding eliminates duplicates by checking the bit array. The TableScan operator then sends only one instance of each data value to the GroupBy operator.

In some implementations, setting (340) a bit in the bit array 330 and sending (344) the data value to the GroupBy operator are performed at the same time, or performed in reverse order (e.g., sending the value before setting the bit).

Note that this process works even if the TableScan has a filter applied. See, e.g., FIGS. 4A and 4B, which illustrate domain queries that limit the rows to be processed. When a filter is specified, the filter is applied either before, or as part of, the read operator 334.

FIGS. 4A, 4B, and 4C show exemplary database queries that may be issued in accordance with some implementations. FIG. 4A, for example, shows an SQL query that could be issued to populate a drop-down list. A user 100 may input (e.g., through a user interface 206) a request for data through a drop-down menu and/or selection list. FIG. 4B shows a query to populate a filter with a "Segment" list (e.g., as shown in FIG. 4D).

The database queries in FIGS. 4A, 4B, and 4C are all domain queries, which can be optimized using the disclosed techniques. Simple domain queries can be identified by the conditions:

(1) The top-level operator is a GroupBy operator;
(2) Its child operator is a TableScan operator; and
(3) The GroupBy operator either a) groups on only one column from the base table and contain no aggregates, or b) contain only MIN and/or MAX aggregates applied to one column from the base table.

Note that the query in FIG. 4C satisfies these conditions because the absence of an explicit GROUP BY clause means that all of the rows of the data source are grouped together to form a single row of output.

While these conditions identify the domain queries in FIGS. 4A, 4B, and 4C, the actual conditions are broader. For example, instead of only matching on top-level operators, domain queries can be subqueries or fragments of a larger query.

Although many domain queries have no selection predicate (i.e., no WHERE clause), this is not required, as illustrated in FIGS. 4A and 4B. In particular, the second condition (2) allows arbitrary selection predicates on the tuples. In FIG. 4A, the predicate depends only on the column whose domain is being queried, so the predicate can be evaluated on the de-duplicated values. For example, if column is encoded using a dictionary in a block, then a set of de-duplicated values can be retrieved from the dictionary, as illustrated in the first block 302 in FIG. 3A. On this de-duplicated set of data values, the WHERE clause can be applied to build the intermediate result set for the block.

In FIG. 4B, the predicate references another column, so it is harder for the table scan to evaluate the restriction on one column while still producing de-duplicated values from another column (see, e.g., the discussion above with respect to FIG. 3B). In some implementations, table scans on data blocks use stored statistical information about the blocks, such as the minimum and maximum values for the data field within the block (e.g., stored in an SMA). In some implementations, when it is not possible to efficiently process the predicate in a table scan, the process falls back to the slower techniques without domain query optimization.

Although MIN and MAX are the typical aggregate functions used in domain queries, other aggregate functions that are not affected by duplicate rows can appear in domain queries. For example, the aggregate function COUNT(DISTINCT . . . ) works because it only counts one for each distinct value. The aggregate function BOOL_OR, BOOL_AND, BIT_OR, and BIT_AND also work because multiple instances of the same data value would not alter the result of the Boolean or bit expressions.

The third condition (3) can be relaxed to allow aggregations on arbitrary expressions as long as the expression references at most one column from the base table. Also, the expression must not be volatile (e.g., include calls to functions like RANDOM).

The query in FIG. 4B returns only segments that are not filtered out by the Order Date filter, which can be used by the user interface window in FIG. 4D. This allows a user to filter the data displayed in a data visualization. The user can filter based on Order Date, Segment, and/or Region. However, depending on the data, the selections are interrelated. In particular, if the user has restricted the range of order dates as illustrated in FIG. 4D, it can affect what segments or regions are relevant to the selected order date range. The query in FIG. 4B is a domain query generated to populate the list of available segments in this user interface window.

In some implementations, if a domain query is found in the operator tree, a flag is set on the corresponding TableScan operator to specify that the parent operator (the GroupBy operator) will discard duplicates. This is generally the only change to the operator tree as part of domain query optimization.

FIG. 4E-4J provide additional examples of domain queries that may benefit from domain query optimization.

FIG. 5A illustrates unoptimized execution of a domain query. FIG. 5A shows three data blocks 502, 504, and 506. The first block 502 is encoded using a dictionary 508, showing that there are three distinct data values stored in the first block 502 (e.g., "Central," "North," and "South"). Without optimization (e.g., not using the dictionary to eliminate duplicates), the TableScan of the first block 502 results in an intermediate result set 512 that includes duplicate values (i.e., multiple occurrences of "Central," "North," and "South") that are sent to the GroupBy operator 518. For example, if the first block 502 includes 64 thousand rows of data, 64 thousand instances are generated and sent to the GroupBy operator 518. The second block 504 stores only one distinct data value ("North") using single-value encoding. However, without optimization, the intermediate result set 514 for the second block 504 includes a plurality of "North" values, all of which are forwarded to GroupBy operator 518. For example, if the second block 504 has 128,000 rows, there are 128,000 instances of this data value in the second intermediate result set 514. The third block 506 is also encoded using a dictionary 510, which shows that there are two distinct data values stored in the block ("Central" and "South"). Without optimization, many instances of "Central" and "South" are included in intermediate result set 516, and all of these data values, including duplicates, are sent to the GroupBy operator 518. The GroupBy operator 518 receives the intermediate result sets 512, 514, and 516 from the three blocks 502, 504, and 506. The GroupBy operator 518 then eliminates duplicate data values from the three blocks to produce the result set 520.

FIG. 5B illustrates retrieval of the same data values from the three data blocks shown FIG. 5A using optimized execution of the domain query. As shown in FIG. 5B, the first block 502 is encoded using the dictionary 508, showing that there are three distinct data values stored in the first block 502 ("Central," "North," and "South"). Using the dictionary 508, the TableScan operator simply forwards the data values from the dictionary 508 without reading the encoded values stored in the data block 502. Thus, the intermediate result set 522 reflects the unique values stored in the dictionary 508. The intermediate result set 522 includes the three data values "Central," "North," and "South" without duplication, and without scanning thousands of rows. The intermediate result set 522 is then sent to GroupBy operator 518.

The second block 504 stores only one distinct data value ("North") and uses a single-value encoding scheme. Recognizing this single-value encoding, only one instance of "North" is included in the intermediate result set 524. Thus, only a single instance of "North" is forwarded to GroupBy operator 518.

The third block 506 is encoded using a dictionary 510, which shows that two distinct values are stored in the block ("Central" and "South"). Without reading the values stored in the third block 506, the TableScan operator produces an intermediate result set 526 from the data values stored in the dictionary (i.e., a single instance of "Central" and a single instance of "South"). Thus, the duplicates stored in the third block 506 are eliminated and only the values of dictionary 510 are sent to the GroupBy operator 518.

The GroupBy operator 518 receives the intermediate result sets 522, 524, and 526 from the TableScan of the three blocks 502, 504, and 506. The GroupBy operator 518 then eliminates duplicate data values from the three blocks to produce the result set 520 (i.e., the same result set is produced from the processes in FIGS. 5A and 5B because the GroupBy operator eliminates duplicates). Note that each of the intermediate result sets 522, 524, and 526 is free of internal duplication, but different blocks may include the same data values, which are eliminated by the GroupBy operator 518.

After detecting a domain query, it is up to the table scan to exploit the optimization potential of the physical storage format. If the consumer of the table scan (the GroupBy operator) ignores/removes duplicates, the table scan operator is free to suppress duplicate values. However, the table scan is by no means forced to do so. It can just as well produce partially de-duplicated tuples or just the original tuples, since its parent operator stays unmodified and still eliminates duplicates that might get produced.

It is up to the TableScan operator to decide to what extent de-duplication can be efficiently done at the TableScan level, taking the physical data representation into account. For example, a dictionary can improve efficiency only if the underlying physical storage actually uses a dictionary (e.g., as shown in FIG. 5B).

As shown in FIG. 5B, despite elimination of duplicates during the TableScan, the GroupBy operator still receives input tuples from three different blocks. Each individual block sends significantly fewer tuples to the GroupBy operator 518 as compared to the unoptimized implementation shown in FIG. 5A. As explained above, for each block, the applied strategy depends on its compression method. For the first and third blocks 508 and 510, which are both using dictionary compression, a scan of the dictionary is sufficient. The lookup of dictionary tokens is avoided. The dictionaries 508 and 510 contain only data values that are actually part of the column's domain. For the second block 504, the duplication step is simply skipped and instead only the one value common to all rows ("North") in this block is generated.

In some implementations, encodings other than dictionary encoding, single-value encoding, and frame of reference using a single byte encoding (e.g., delta encoding and affine encoding) cannot be exploited for handling domain queries more efficiently. For those encodings the TableScan passes all of the data values for the column and relies on the duplicate-eliminating parent operator (e.g., the GroupBy operator).

Figure 6A:
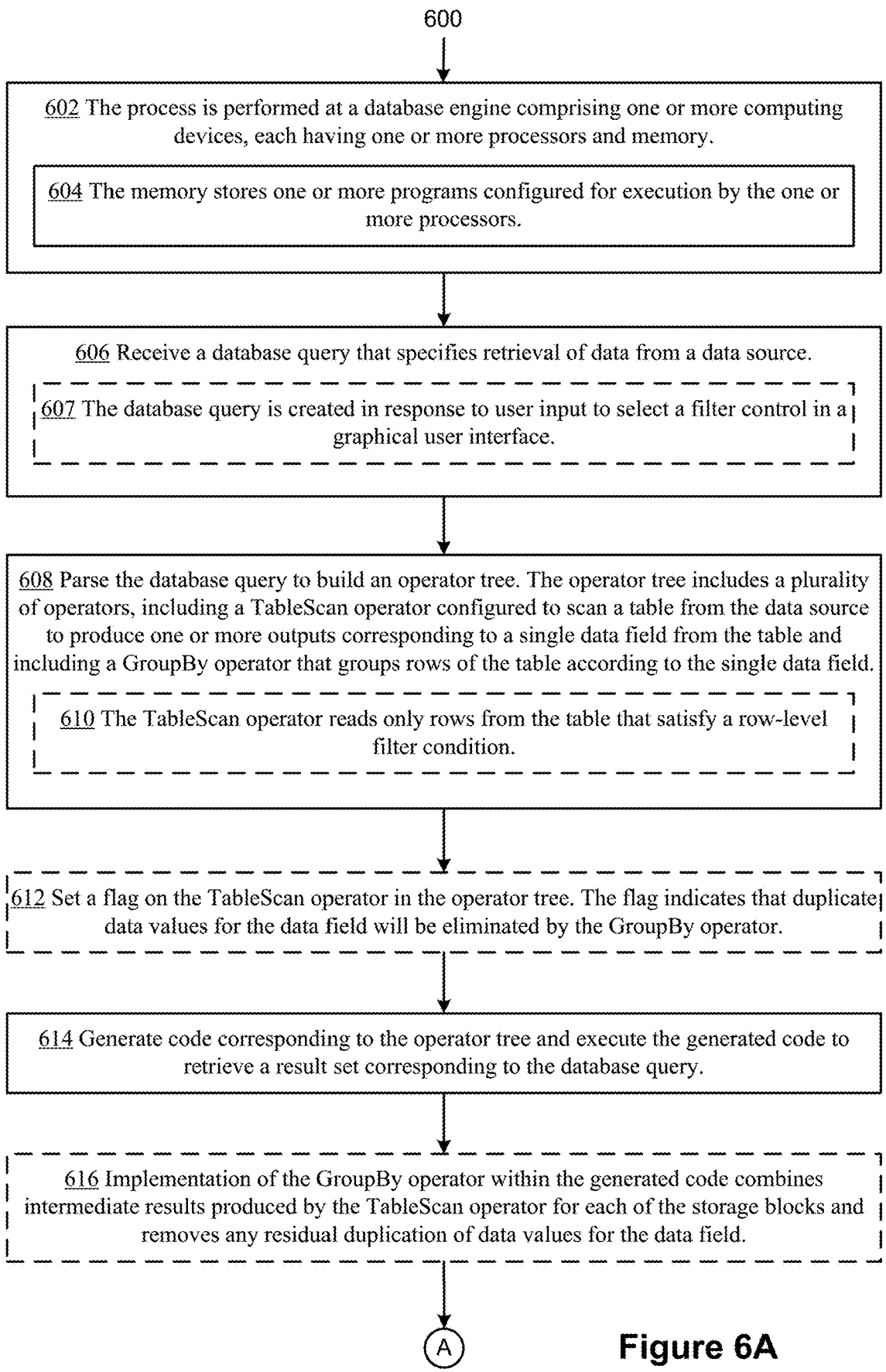
Figure 6C:
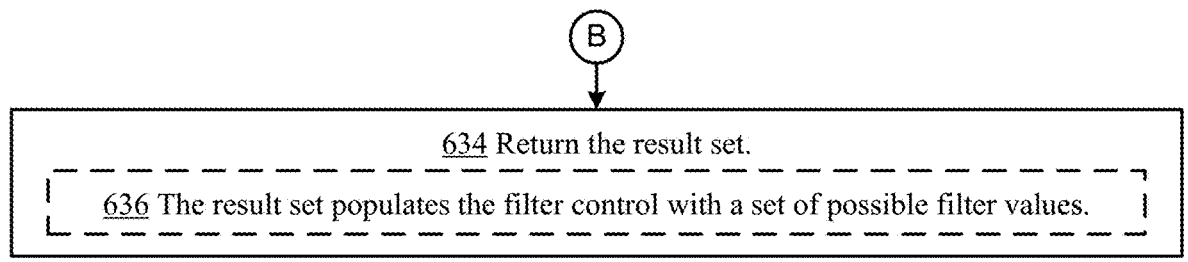

FIGS. 6A-6C provide a flowchart of a process 600 for retrieving data from a database. The process 600 is performed (602) at a database engine having one or more computing devices, each having one or more processors and memory. The memory stores (604) one or more programs configured for execution by the one or more processors.

The database engine 120 receives (606) a database query 226 that specifies retrieval of data from a data source. In some instances, the data base query is created (607) in response to user input to select a filter control in a graphical user interface. The database engine 120 (or the query parser 228 within the database engine) parses (608) the database query 226 to form an operator tree 230. The operator tree 230 includes (608) a plurality of operators. The plurality of operators includes (608) a TableScan operator configured to scan a table from the data source to produce one or more outputs corresponding to a single data field from the table and includes (608) a GroupBy operator that groups rows of the table according to the single data field. In some instances, the TableScan operator reads (610) only rows from the table that satisfy a row-level filter condition.

In some instances, the database engine 120 sets (612) a flag on the TableScan operator in the operator tree 230. The flag indicates that duplicate data values for the data field will be eliminated by the GroupBy operator.

The database engine 120 generates (614) code (e.g., using the compiler 242) corresponding to the operator tree and executes (614) (e.g., using the execution module 250) the generated code to retrieve a result set corresponding to the database query 226.

In some instances, implementation of the GroupBy operator, as determined by the operator implementation module 244, combines (616) intermediate results produced by the TableScan operator for each of the storage blocks and removes any residual duplication of data values for the data field. For example, with reference to FIG. 3A, the intermediate results from the first block 1 (302) passed to the GroupBy operator 326 and the intermediate results from the second block 2 (304) passed to the GroupBy operator 326 may both include the same data value (e.g., "Alpha"). The implementation of the GroupBy operator may combine the intermediate results from the blocks to eliminate this residual duplication of data values (e.g., "Alpha").

When the TableScan operator is a child of the GroupBy operator in the operator tree and the one or more outputs either do not include any aggregate functions or include only aggregate functions whose calculated values are independent of duplicate input rows from the table, implementation of the TableScan operator within the generated code includes (618) determining a respective storage compression scheme for encoding the data field within the respective block. When the respective storage compressions scheme is dictionary encoding, frame of reference encoding using a single byte, or single-value encoding, the TableScan operator uses (618) the encoding to produce the one or more outputs without duplication of rows.

In some instances, a storage block (e.g., the first block 1 (302) in FIG. 3A) for the table encodes (620) the data field using dictionary encoding according to a dictionary. Producing the one or more outputs for the storage block comprises (620) scanning the dictionary instead of scanning the table.

In some instances, a storage block (e.g., the second block 2 (304) in FIG. 3A) for the table encodes (622) the data field using single-value encoding, which specifies a single data value for the data field for all rows of the table within the storage block. Producing the one or more outputs for the storage block comprises (622) producing a single instance of the single data value.

In some instances, a storage block (e.g., the third block 3 (306) in FIG. 3A) for the table encodes (624) the data field using frame of reference encoding using a single byte. Producing the one or more outputs for the storage block comprises (624): allocating a bit array of 256 bits, each bit corresponding to a distinct data value for the data field in the storage block, and scanning the rows of the table in the storage block. In some instances, the scanning includes (626) reading a respective offset value for the data field in the respective row. When the respective bit corresponding to the respective offset value is already set in the bit array, the process forgoes (626) production of the corresponding data value. When the respective bit is not already set in the bit array, the process looks up (626) the corresponding data value according to the offset value, produces (626) the corresponding data value, and sets (626) the respective bit in the bit array. In some instances, the frame of reference encoding uses more than a single byte to specify offsets (e.g., 2 or 4 bytes).

In some instances, a storage block (e.g., the fourth storage block 4 (308) in FIG. 3A) for the table encodes (628) the data field using an encoding other than dictionary encoding, frame of reference encoding using a single byte, or single-value encoding. The process produces (628) a data value instance for each row of the table in the storage block, regardless of duplication.

In some instances, at least two of the storage blocks from the table use (630) different storage compression schemes for encoding the data field.

In some implementations, the aggregate functions whose calculated values are independent of duplicate input rows from the table include (632) the aggregate functions MIN( ) and MAX( ). In some implementations, the aggregate functions in this group include BOOL_OR( ), BOOL_AND( ), COUNT(DISTINCT ... ), and any other aggregate functions where the calculated values do not depend on duplicates.

The database engine 120 returns (634) the result set. In some instances, the result set populates (636) the filter control with a set of possible filter values.

In some instances, the process 600 is performed (e.g., repeated) on more than one data field (e.g., more than one column).

Figure 7:
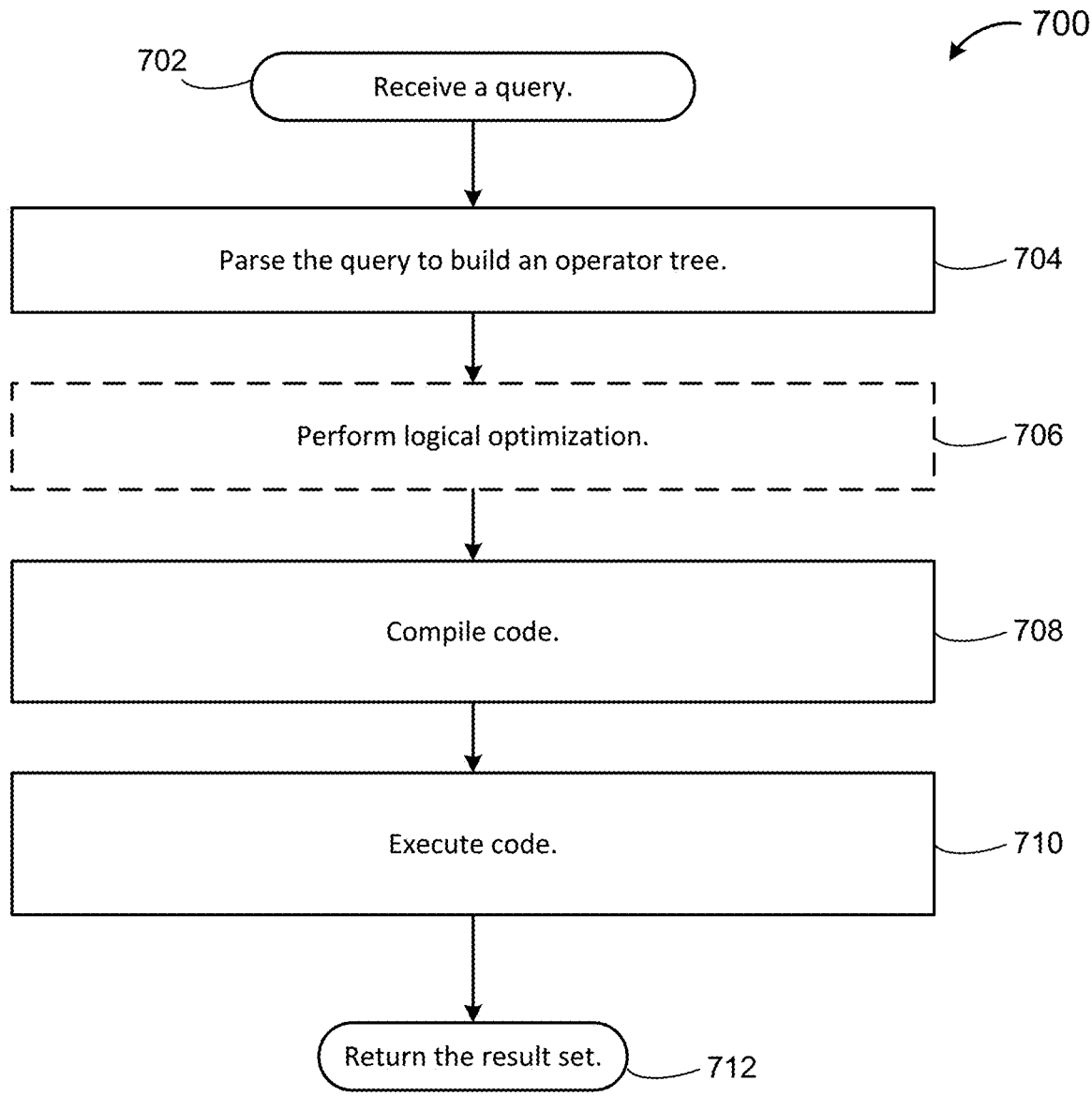
FIG. 7 is a process flow diagram that illustrates a process for retrieving data from a database, according to some implementations.

FIG. 7 illustrates a process 700 for retrieving data from a database according to some implementations. The process 700 receives (702) a query 226, which may correspond to a domain query 227 (e.g., the domain query shown in FIG. 4A). The query parser 228 parses (704) the query 226 to build an operator tree 230, which includes a plurality of operators. In some cases, the logical optimizer 240 performs logical optimization (706), which modifies the operator tree 230 to improve performance (e.g., increase efficiency and/or speed of evaluating the operator tree) in addition to the physical optimizations performed by the compiler 242. In some implementations, the optimizations performed by the logical optimizer 240 include the described techniques for domain query optimization (e.g., setting a flag on each TableScan operator that is part of a domain query). Later, during compilation, the generated code for the TableScan operator utilizes the techniques described herein.

The compiler 242 compiles (708) the operator tree (whether logically optimized or not) to form executable machine code. In some implementations, the compiler 242 performs physical optimizations interleaved with code generation. For example, the operator implementation module 244 determines and/or modifies how to implement operators (e.g., a TableScan operator and/or a GroupBy operator) in the operator tree 230.

The execution module 250 then executes (710) the compiled code and returns (712) the result set. Executing the machine code builds the result set, and the database engine 120 returns the result set to the client that initiated the query. The "client" may be an application running on the same computing device 200 as the database engine 120 or on a remote computing device 200.

In some implementations, the overall process in FIG. 7 depends on the size of the table to be scanned. For example, when the table is small, the cost of setting up and/or executing a domain query with optimization may exceed the benefit of the techniques, so the process may select a standard implementation for a domain query. In some implementations, the size of the data can also influence whether to execute the query in an interpreted mode or compiled to machine code. For example, when the number of rows is large, the costlier compilation process is counterbalanced by the efficiency of the machine code.

In some cases, domain queries can be removed as part of the logical optimization. For example, if a domain query is issued against a column that is known to be unique (e.g., either because it is a primary key or because it has a uniqueness constraint), some implementations remove the GroupBy operator. However, for denormalized data models (e.g., a data warehouse), the initially unique data values from original domain tables get duplicated by the joins during extract creation. For this reason, the logical optimization is in many cases not applicable. When the GroupBy operator cannot be removed during logical query optimization, implementations leverage knowledge about physical storage to optimize domain queries as described above.

Without domain query optimization, the database engine uses a normal table scan over the queried column. This table scan produces one column value for each row. Typically, this involves expanding single value compressed columns by duplicating the column's static value for each row. Each of these tuple values is then passed to a hash-based GroupBy operator, which removes all duplicate values again.

As illustrated above, the execution time of the query improves by skipping the generation of the duplicates in the table scan, which are subsequently removed by the GroupBy operator. In order to speed up the query, some implementations provide a hint to the table scan operator to make it aware that duplicates will be discarded by its parent operator (e.g., a flag on the table scan operator). The table scan then has the freedom to skip producing duplicated tuples altogether. Instead, it can now use its knowledge of the underlying physical data representation, (e.g., knowledge of single value compression, dictionaries, or run length encoding) in order to reduce the number of produced duplicate values.

As noted previously, the GroupBy operator remains in place to address duplication across blocks and to address blocks that are encoded in a way that cannot be efficiently optimized. This means that the table scan has the freedom to skip duplicated tuples but is not forced to do so. In this way, the table scan is still allowed to produce duplicated tuples when it cannot efficiently remove duplicates. The GroupBy operator handles de-duplication very efficiently, so removing the duplicates at the table scan stage is appropriate only when it can be done very efficiently. A table scan operator can be more efficient than the GroupBy operator at de-duplicating values when it can exploit special properties of the underlying physical storage layer.

The first step to optimize domain queries is to detect them. In general, this detection can be implemented at different stages of the query lifecycle.

Some implementations detect domain queries at the syntactic level. This works when the input queries follow a predictable pattern. Doing so allows bypassing the semantic analysis and optimization steps. However, for some implementations, this involves duplicating parts of the parsing logic. In addition, because typical domain queries cannot utilize join ordering, skipping semantic analysis and optimization does not yield a significant performance advantage.

Some implementations detect domain queries as part of logical query optimization. In this stage, the database engine applies constant folding, reorganizes reordering, and many other logical optimizations. Detecting a domain query in the operator tree uses simple local pattern matching. Compared to detection at the syntactic level, the detection here does not require duplicating parsing logic. In addition, the logical query optimizer can profit from more accurate estimates when it is aware of domain query optimization.

Some implementations detect domain queries as part of code generation. During this phase, the overall query plan is already fixed. However, local physical optimizations are still carried out in this phase, interleaved with code generation. For instance, checks for non-nullable values are skipped and the appropriate indices are picked. Detecting domain queries at this stage requires the same detection logic as in logical query optimization. When domain queries are detected at this level, the logical optimizer is not aware of the number of tuples actually produced by a table scan. On the other hand, moving the detection logic from the logical query optimization to the physical query optimization keeps the optimizer code focused.

A table is stored in blocks in the database. In some implementations, blocks store about $2^{17}$ (i.e., about 128000) tuples. In some implementations, the data in the blocks is stored in a columnar format (which facilitates domain query optimization). A compression scheme is chosen independently per-block and per-column. FIG. 5A above shows an unoptimized scan on a column consisting of 3 Data Blocks. The first column is compressed using a dictionary. When scanning this Data Block, the database engine looks up every token from the data stream in the dictionary and passes the resulting strings on to the GroupBy operator. Note that the stream containing the dictionary tokens itself is not compressed. The second Data Block contains only one distinct value and this value is stored only once. When the table scan scans this block, it duplicates this single value once for every row stored in the Data Block (e.g., $2^{17}$ times). The third block stores data for the columns using a dictionary. Within this block, the column does not contain any instance of the region "North." Accordingly, the corresponding dictionary does not contain an entry for it. All tuples generated from the individual Data Blocks are handed to the GroupBy operator. The GroupBy operator eliminates all duplicates and sends the set of domain values to Tableau.

The Data Block format enables evaluation of additional restrictions on columns other than the column whose domain is being queried. For example, the query in FIG. 4B can benefit from domain query optimization. Although building a list of data values for the segment data field, the query is limited by the order_date field. To optimize this processing, the restriction on the order_date column is first evaluated against the minimum order_date value in the block. Some implementations store the minimum order_date for each block as part of the statistical data for the column. This statistical data is sometimes referred to as a small materialized aggregate (SMA). In some instances, this comparison reveals that the condition always evaluates to true for the current Data Block. In this case, the block's domain is scanned just as if the restriction did not exist. On the other hand, if the SMA indicates that the query condition evaluates to false for all of the data values from the block (e.g., by determining that the maximum order_date in the block is less than the cutoff), the whole block is skipped. When the evaluation of the restrictions on the SMA is inconclusive, the block is scanned in a normal fashion (e.g., without domain query optimization). The fallback to a normal scan is done on a block-by-block basis. Even if some individual blocks cannot take advantage of domain query optimization because the SMA data is inconclusive, some blocks can still benefit.

Although some implementations split a table into multiple blocks, other implementations use a single block to encode a table and use a single encoding scheme for the single block. Even when there is only a single block, the single block can benefit from the techniques described to perform domain query optimization. In particular, implementations leverage deduplication in the storage layer to compute the result of a domain query. This is independent of how the storage layer itself is organized. Some implementations horizontally partition a table into blocks and encode each block individually. Other implementations do not partition and build a duplicate-free global dictionary. A global dictionary can be leveraged in the same way as described above for individual blocks.

Some implementations expand the definition of domain queries even further to include queries where the TableScan is not a direct child of the GroupBy operator. When a GroupBy operator acts on a single field, the duplicate-insensitivity is propagated down the tree where possible. For example, duplicate-insensitivity propagates across the preserving side(s) of joins, outer joins, semi-joins, and anti-joins. If a TableScan involves a single field, and duplicate-insensitivity for that field has been propagated from above, the TableScan can be treated as a domain query that utilizes the disclosed optimization techniques. In this case, the TableScan is a child of the GroupBy operator, but not necessarily a direct child.

In addition, some implementations track duplicate-insensitivity for operators other than GroupBy operators, such as the left side of a right semi-join or the left side of a right anti-join. The duplicate-insensitivity of these additional operators can be propagated down the tree, and if the corresponding single data field is in a TableScan below it in the tree, the TableScan can be treated as a domain query.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A database engine, comprising:
one or more computing devices, each having one or more processors and memory, wherein the memory stores one or more programs configured for execution by the one or more processors, the one or more programs comprising instructions for:
receiving a database query specifying retrieval of data from a data source;
parsing the database query to build an operator tree that includes a plurality of operators, including a TableScan operator configured to scan a table from the data source to produce one or more outputs corresponding to a single data field from the table, and including a GroupBy operator that groups rows of the table according to the single data field;
generating code corresponding to the operator tree and executing the generated code to retrieve a result set correspond to the database query, wherein:
in accordance with a determination that the TableScan operator is a child of the GroupBy operator in the operator tree and a determination that the one or more outputs either do not include any aggregate functions or include only aggregate functions whose calculated values are independent of duplicate input rows from the table, implementation of the TableScan operator within the generated code comprises, for each storage block of rows from the table:
i) determining a respective storage compression scheme for encoding the data field within the respective block; and
ii) when the respective storage compression scheme is dictionary encoding, frame of reference encoding using a single byte, or single-value encoding, using the encoding to produce the one or more outputs without duplication of rows; and
returning the result set.

2. The database engine of claim 1, wherein a first storage block for the table encodes the data field using dictionary encoding according to a first dictionary, and producing the one or more outputs, for the first storage block, comprises scanning the first dictionary instead of scanning the table.

3. The database engine of claim 1, wherein a first storage block for the table encodes the data field using single-value encoding, which specifies a single data value for the data field for all rows of the table within the first storage block, and producing the one or more outputs, for the first storage block, comprises producing a single instance of the single data value.

4. The database engine of claim 1, wherein a first storage block for the table encodes the data field using frame of reference encoding using a single byte, and producing the one or more outputs, for the first storage block, comprises:
allocating a bit array of 256 bits, each bit corresponding to a distinct data value for the data field in the first storage block; and
scanning the rows of the table in the first storage block, including, for each row in the table:
i) reading a respective offset value for the data field in the respective row;
ii) when a respective bit corresponding to the respective offset value is already set in the bit array, forgoing production of a respective data value corresponding to the respective offset value; and
iii) when the respective bit corresponding to the respective offset value is not already set in the bit array, looking up the respective data value according to the respective offset value, producing the respective data value, and setting the respective bit in the bit array.

5. The database engine of claim 1, wherein a first storage block for the table encodes the data field using an encoding other than dictionary encoding, frame of reference encoding using a single byte, or single-value encoding, and producing the one or more outputs, for the first storage block, comprises producing a data value instance for each row of the table in the first storage block, regardless of duplication.

6. The database engine of claim 1, wherein the database query is created in response to user input to select a filter control in a graphical user interface, and the result set populates the filter control with a set of possible filter values.

7. The database engine of claim 1, further comprising setting a flag on the TableScan operator in the operator tree, wherein the flag indicates that duplicate data values for the data field will be eliminated by the GroupBy operator.

8. The database engine of claim 1, wherein the TableScan operator reads only rows from the table that satisfy a row-level filter condition.

9. The database engine of claim 1, wherein at least two of the storage blocks from the table use different storage compression schemes for encoding the data field.

10. The database engine of claim 1, wherein implementation of the GroupBy operator within the generated code combines intermediate results produced by the TableScan operator for each of the storage blocks and removes any residual duplication of data values for the data field.

11. The database engine of claim 1, wherein the aggregate functions whose calculated values are independent of duplicate input rows from the table include the aggregate functions MIN( ) and MAX( ).

12. A method of retrieving data from a database, comprising:
at a computer system having one or more processors and memory, wherein the memory stores one or more programs configured for execution by the one or more processors, the one or more programs comprising instructions for:
receiving a database query specifying retrieval of data from a data source;
parsing the database query to build an operator tree that includes a plurality of operators, including a TableScan operator configured to scan a table from the data source to produce one or more outputs corresponding to a single data field from the table, and including a GroupBy operator that groups rows of the table according to the single data field;
determining that the TableScan operator is a child of the GroupBy operator in the operator tree and determining that the one or more outputs either do not include any aggregate functions or include only aggregate functions whose calculated values are independent of duplicate input rows from the table;
in accordance with the determination that the TableScan operator is a child of the GroupBy operator in the operator tree and in accordance with the determination that the one or more outputs either do not include any aggregate functions or include only aggregate functions whose calculated values are independent of duplicate input rows from the table, generating code corresponding to the operator tree, the generated code configured to execute for each block, wherein:

i) the generated code includes code to determine a respective storage compression scheme for encoding the data field within the respective block; and ii) the generated code includes code (a) to determine when the respective storage compression scheme is dictionary encoding, frame of reference encoding using a single byte, or single-value encoding, and (b) to use the encoding to produce the one or more outputs without duplication of rows; and executing the generated code to retrieve a result set correspond to the database query and returning the result set.

13. The method of claim 12, wherein a first storage block for the table encodes the data field using dictionary encoding according to a first dictionary, and producing the one or more outputs, for the first storage block, comprises scanning the first dictionary instead of scanning the table.

14. The method of claim 12, wherein a first storage block for the table encodes the data field using single-value encoding, which specifies a single data value for the data field for all rows of the table within the first storage block, and producing the one or more outputs, for the first storage block, comprises producing a single instance of the single data value.

15. The method of claim 12, wherein a first storage block for the table encodes the data field using frame of reference encoding using a single byte, and producing the one or more outputs, for the first storage block, comprises:

allocating a bit array of 256 bits, each bit corresponding to a distinct data value for the data field in the first storage block; and scanning the rows of the table in the first storage block, including, for each row in the table:

i) reading a respective offset value for the data field in the respective row;

ii) when a respective bit corresponding to the respective offset value is already set in the bit array, forgoing production of a respective data value corresponding to the respective offset value; and iii) when the respective bit corresponding to the respective offset value is not already set in the bit array, looking up the respective data value according to the respective offset value, producing the respective data value, and setting the respective bit in the bit array.

16. The method of claim 12, wherein a first storage block for the table encodes the data field using an encoding other than dictionary encoding, frame of reference encoding using a single byte, or single-value encoding, and producing the one or more outputs, for the first storage block, comprises producing a data value instance for each row of the table in the first storage block, regardless of duplication.

17. The method of claim 12, wherein at least two of the storage blocks from the table use different storage compression schemes for encoding the data field.

18. The method of claim 12, wherein implementation of the GroupBy operator within the generated code combines intermediate results produced by the TableScan operator for each of the storage blocks and removes any residual duplication of data values for the data field.

19. The method of claim 12, wherein the aggregate functions whose calculated values are independent of duplicate input rows from the table include the aggregate functions MIN( ) and MAX( ).

20. A non-transitory computer readable storage medium storing one or more programs configured for execution by a computer system having one or more processors and memory, the one or more programs comprising instructions for:

receiving a database query specifying retrieval of data from a data source;

parsing the database query to build an operator tree that includes a plurality of operators, including a TableScan operator configured to scan a table from the data source to produce one or more outputs corresponding to a single data field from the table, and including a GroupBy operator that groups rows of the table according to the single data field;

generating code corresponding to the operator tree and executing the generated code to retrieve a result set correspond to the database query, wherein:

in accordance with a determination that the TableScan operator is a child of the GroupBy operator in the operator tree and a determination that the one or more outputs either do not include any aggregate functions or include only aggregate functions whose calculated values are independent of duplicate input rows from the table, implementation of the TableScan operator within the generated code comprises, for each storage block of rows from the table:

i) determining a respective storage compression scheme for encoding the data field within the respective block; and ii) when the respective storage compression scheme is dictionary encoding, frame of reference encoding using a single byte, or single-value encoding, using the encoding to produce the one or more outputs without duplication of rows; and returning the result set.

* * * * *